(No Model.)
M. ZECK.
DEVICE FOR GENERATING AND BURNING GAS OR VAPOR.
No. 378,411. Patented Feb. 21, 1888.
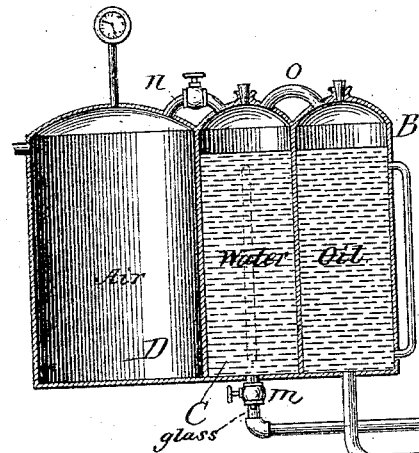
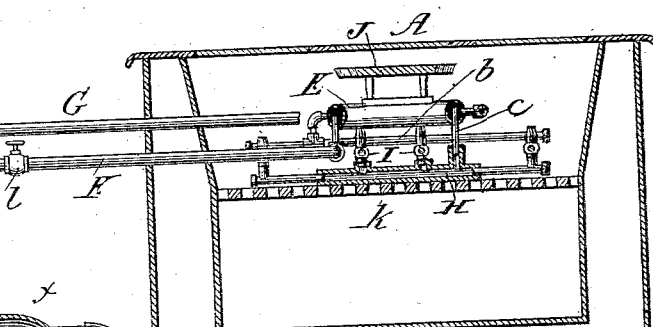
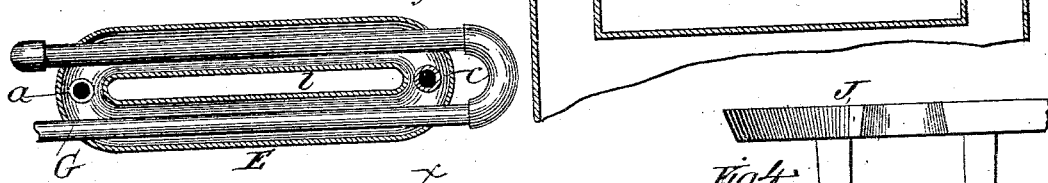
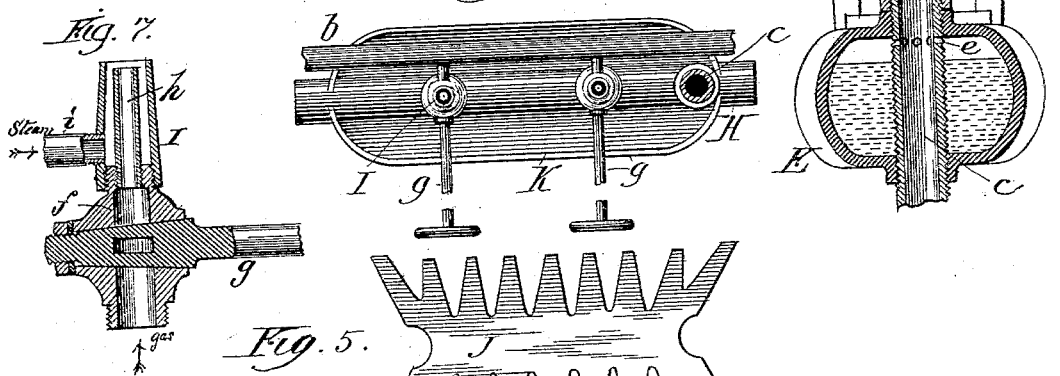
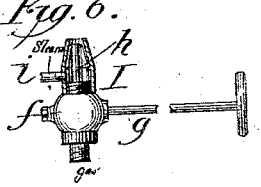
Witnesses:
E. A. West
Harry T. Jones
Inventor:
Michael Zeck.

UNITED STATES PATENT OFFICE.

MICHAEL ZECK, OF CHICAGO, ILLINOIS, ASSIGNOR TO HIMSELF AND ASA DONEY, OF SAME PLACE.

DEVICE FOR GENERATING AND BURNING GAS OR VAPOR.

SPECIFICATION forming part of Letters Patent No. 378,411, dated February 21, 1888.

Application filed November 11, 1886. Serial No. 218,595. (No model.)

*To all whom it may concern:*

Be it known that I, MICHAEL ZECK, residing at Chicago, in the county of Cook and State of Illinois, and a citizen of the United States, have invented a new and useful Improvement in Devices for Generating and Burning Gas and Vapor, of which the following is a full description, reference being had to the accompanying drawings, in which—

Figure 1 is a vertical section. Fig. 2 is a horizontal section through the generator. Fig. 3 is a plan showing the burners and tubes through which the gas and water-vapor are supplied thereto. Fig. 4 is a detail, being a vertical section through the generator and tube leading therefrom, taken at line $x$ of Fig. 2, looking to the left. Fig. 5 is a top view of the flame-spreader. Figs. 6 and 7 are details showing the construction of the burner. Figs. 2, 3, 4, 5, 6, and 7 are enlarged.

This improvement relates to that class of devices in which gas from some carbon oil and water-vapor are used for fuel.

The leading object of my invention is to provide improved devices to be used in generating the gas and converting the water into vapor and for controlling their union and combustion, which I accomplish as illustrated in the drawings and hereinafter described.

That which I claim as new will be set forth in the claims.

In the drawings, A represents a stove.

B is a receptacle for oil.

C is a receptacle for water.

D is an air-chamber, into which air may be forced and compressed for the purpose of forcing the oil and water to the stove when the receptacles which contain them are located below the stove.

E is the vapor-generator, located in the stove and supported therein in any suitable manner. It is formed with narrowed longitudinal flame-slot $l$, so that the flame and heat from the burners will come more directly in contact with the two opposite walls of the generator, and being thus brought into contact with the walls and within such a confined space between them, there will be a more efficient heating of the generator and generation of the gas.

F is a pipe leading from the oil-reservoir to the generator.

$a$, Fig. 2, is the opening from the oil-pipe into the generator.

G is the water-pipe leading from the reservoir C. This pipe passes through the generator upon one side, then back through the generator upon the other side, as shown in Fig. 2, thence down to a tube, $b$, closed at both ends, from which the water-vapor passes to the burners.

$c$ is a tube leading from the generator E to the pipe H, in which the burners are secured. A convenient way to arrange this pipe $c$ is shown in Fig. 4, the pipe $c$ passing up through the bottom of the generator, then through the body of the generator, and extending up through the top of the generator, the top of the pipe being closed by a cap, $d$, upon the removal of which access may be had to the tube $c$. This tube is provided with a series of holes, $e$, located within the generator, but near the upper part thereof.

I are burners, any suitable number of which may be used. Four are shown in Fig. 1. These burners at their lower ends are connected with the pipe H. Each burner is provided with a valve located in the ball or body $f$. The valve is of ordinary construction.

$g$ are the valve-stems. The upper part of the burner is made double. The center tube, $h$, is for the passage of the gas from the oil used, and it communicates with the bulb $f$, and the flow of the gas through $h$ is controlled by the valve. The water-vapor is admitted into the upper part of the burner through a small tube, $i$. It passes into a chamber which surrounds the tube $h$, and the gas and the water-vapor come together at the upper end of the burner.

J is a flame-spreader provided with legs $j$, the lower ends of which rest upon the top of the generator E.

K is a pan resting upon the stove-grate $k$, into which pan a little kerosene or other oil may be poured, which, being ignited, will sufficiently heat the generator to form gas therein when it is desired to start a fire.

The flow of the oil and water may be regulated by valves $l\,m$. I provide the water-pipe G with a piece of glass, so that the flow of the water may be observed.

The operation is as follows: When the oil and water receptacles are located at a point above the stove, the oil and water will be fed by gravity. The oil will flow into the generator E, nearly filling the same, and will there be converted into gas, which will flow through the tube $c$ into the tube H, and from this tube to as many of the burners as may be desired, the flow to the burners being controlled or entirely cut off by the valves therein. Water will at the same time flow through the tube G, which passes, as before stated, through the generator, and the heat will be sufficient to convert the water into steam, which will pass down into the pipe or tube $b$, and from this pipe through branch pipes $i$ to the several burners. The steam from the water and gas from the oil will unite at the tops of the burners, and an intense heat will be produced sufficient to continue to generate the gas and water-vapor, and also furnish sufficient heat for the requirements of the stove.

It will sometimes be convenient to locate the water and oil reservoirs in a basement, while the stove is located on a floor above. When so located I use the air-chamber D for the purpose of forcing the oil and water to the stove. By means of a suitable air-pump air can be forced into the reservoir D under sufficient pressure, and as there is a communication from this chamber by a tube, $n$, to the upper part of the water-reservoir, and from the upper part of the water-reservoir by a tube, $o$, to the upper part of the oil-reservoir, the oil and water will be forced to the stove by the pressure of the air.

I am aware that various devices for generating and combining water-vapor and oil-gas for heating purposes have heretofore been devised and used, and of course I do not claim such, broadly; but I am not aware that an apparatus for generating and burning gas and water-vapor has hitherto embraced the specific construction and relative arrangement of parts hereinbefore set forth, with the consequent advantages of simplicity, compactness, and safety, whereby the apparatus is especially adapted for domestic use.

What I claim as new, and desire to secure by Letters Patent, is—

1. The combination of the oil-reservoir B, the water-reservoir C, the gas-generator E, a pipe, F, for conveying oil to the gas-generator, a water-pipe, G, passing through the gas-generator, one or more burners, I, a pipe, H, that supports and communicates with said burners, a vertical pipe, $c$, leading from the gas-generator to the pipe H, and a horizontal pipe, $b$, that communicates with the water-pipe and burners to convey water-vapor to the burners, substantially as shown and described.

2. The combination of a gas-generator, E, an oil-reservoir, B, a water-reservoir, C, a pipe, F, leading from the oil-reservoir to the gas-generator, a pipe, G, leading from the water-reservoir and passed through the gas-generator, an air-chamber, D, a direct pipe-connection, $n$, between the air-chamber and water-reservoir, and a direct pipe-connection, $o$, between the water and oil reservoirs, substantially as shown and described.

MICHAEL ZECK.

Witnesses:
ALBERT H. ADAMS,
E. A. WEST.